Figure 1:
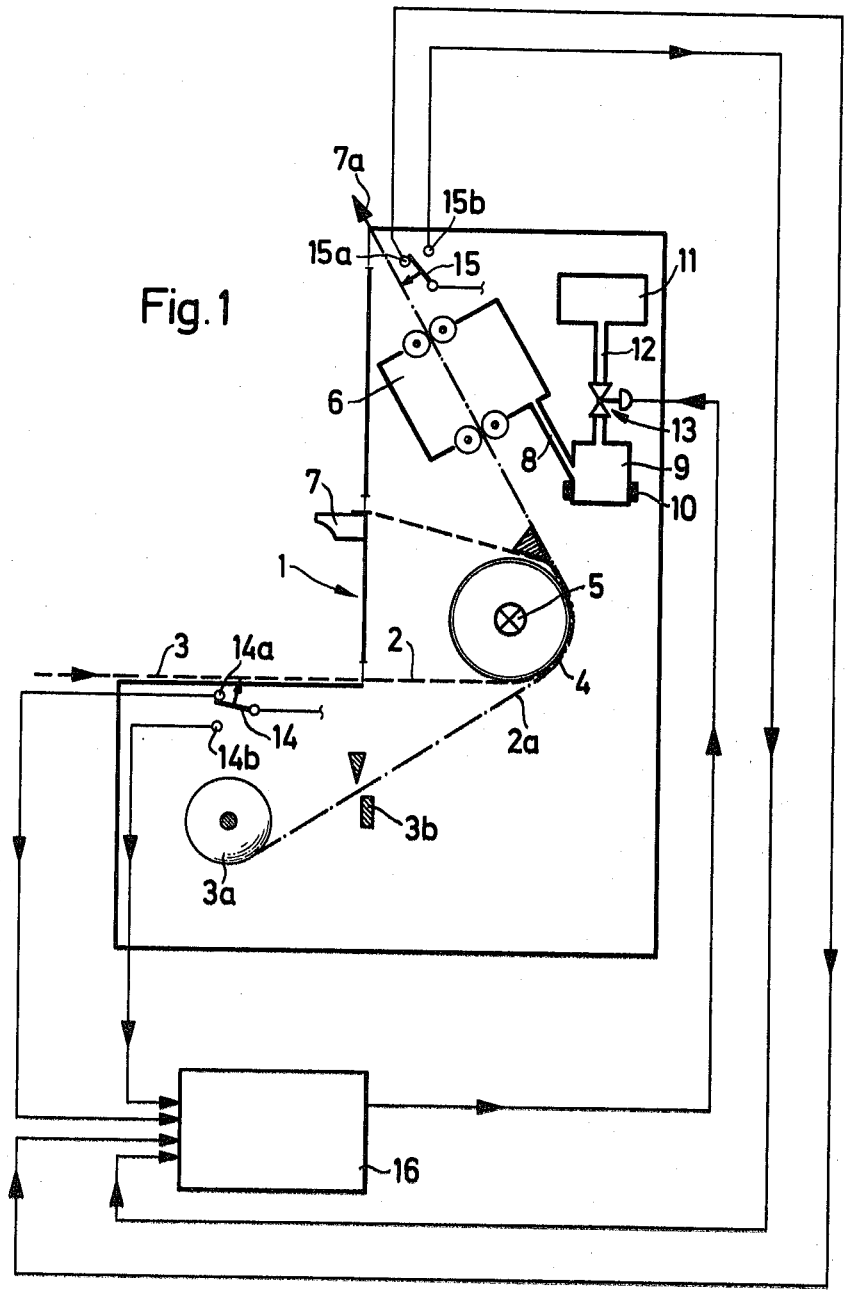

United States Patent [19]
Schröter et al.

[11] 4,099,868
[45] Jul. 11, 1978

[54] COPYING APPARATUS, IN PARTICULAR PHOTOPRINTING APPARATUS, COMPRISING A DEVELOPING CHAMBER WHICH OPERATES ACCORDING TO THE DRY-DEVELOPMENT PRINCIPLE, AND A DOSING DEVICE FOR LIQUID DEVELOPER MEDIUM

[75] Inventors: Herbert Schroter, Taunusstein; Eckehard Stein, Frankfurt, both of Fed. Rep. of Germany

[73] Assignee: Hoechst Aktiengesellschaft, Fed. Rep. of Germany

[21] Appl. No.: 781,104

[22] Filed: Mar. 25, 1977

[30] Foreign Application Priority Data

Mar. 29, 1976 [DE] Fed. Rep. of Germany ....... 2613331

[51] Int. Cl.² ............................................. G03B 27/30
[52] U.S. Cl. ................................................... 355/106
[58] Field of Search ............... 355/107, 108, 110, 111, 355/132, 77, 100, 105, 106, 27, 28; 96/49

[56] References Cited
U.S. PATENT DOCUMENTS

| 2,761,364 | 9/1956 | Cross | 96/49 X |
|---|---|---|---|
| 3,031,941 | 5/1962 | Moser | 355/100 |
| 3,127,825 | 4/1964 | Limberger | 355/106 |
| 3,160,085 | 12/1964 | Mastroianni | 355/106 |
| 3,174,420 | 3/1965 | Aizawa | 355/106 |
| 3,380,365 | 4/1968 | Umahashi | 355/106 |
| 3,710,708 | 1/1973 | Schuman et al. | 355/106 X |

Primary Examiner—Donald A. Griffin
Attorney, Agent, or Firm—James E. Bryan

[57] ABSTRACT

This invention relates to an improvement in a copying apparatus, particularly a photoprinting apparatus, comprising an exposure station, a developing chamber, and an evaporator associated with the developing chamber, in which a developer composed of an ammonia/water mixture is virtually completely evaporated and overheated at a temperature about 100° C, preferably about 105° C, and at a predetermined pressure, preferably atmospheric pressure, the apparatus further including, for dosage of the ammonia/water mixture, a feed pipe connected with the evaporator, a valve connected with the feed pipe, and a control unit connected with the valve, whereby the rate of feed of the ammonia/water mixture may be adapted to different operating conditions, the improvement comprising first switch means, actuatable by an original, positioned at an entrance for the original upstream of an exposure station in the feed direction of the apparatus. Second switch means, actuatable by a copying material, positioned at a delivery point of said copying material downstream of said developing chamber, control unit means electrically connected with said first and second switch means, said control unit being so constructed that after said first switch means has been switched to a first position by the original, the valve is first opened for a relatively long period of time, and the valve is then alternately opened and closed, in accordance with pulses, as long as the first or second switch means is maintained in its first switching position by one or more originals or one or more sheets of copying material, respectively, and said pulse-wise opening and closing of the valve is terminated only when neither the first nor the second switch means is maintained in its first switching position by an original or a sheet of copying material, respectively.

6 Claims, 3 Drawing Figures

COPYING APPARATUS, IN PARTICULAR PHOTOPRINTING APPARATUS, COMPRISING A DEVELOPING CHAMBER WHICH OPERATES ACCORDING TO THE DRY-DEVELOPMENT PRINCIPLE, AND A DOSING DEVICE FOR LIQUID DEVELOPER MEDIUM

The present invention relates to a copying apparatus, in particular to a photoprinting apparatus, comprising an exposure station, a developing chamber, and an evaporator associated with the developing chamber, in which a developer composed of an ammonia/water mixture is virtually completely evaporated and overheated at a temperature above 100° C, preferably at about 105° C, and at a predetermined pressure, preferably atmospheric pressure, the apparatus further comprising, for dosage of the ammonia/water mixture, a feed pipe connected with the evaporator, a valve connected with the feed pipe, and a control unit connected with the valve, whereby the rate of feed of the ammonia/water mixture may be adapted to different operating conditions.

In a known device of this type (Canadian Pat. No. 573,464), the temperatures within the evaporator and within the developing chamber are in each case maintained above 100° C. Preferably, the temperature within the developing chamber is adjusted to 115° C. However, between the evaporator and the developing chamber there is a condenser, the walls of which are maintained at a temperature below 100° C. In a preferred embodiment, vapor is introduced into the condenser at a temperature of 90° C and leaves it at a temperature of 69° C. In the condenser, water and ammonia are condensed from the vapor to form $NH_4OH$ which is then carried off. The device is provided with several control means in order to be able to adapt it to different operating conditions, especially different feed speeds of the copying material. For example, it is possible to reduce the quantity of developer solution fed to the evaporator per unit time to allow for a lower feed speed, and vice versa.

In the following, the problems involved will be discussed:

Unlike in the case of other copying machines, especially electrophotographic copying machines, switching the machine from a state of readiness, during which no copying material is developed, to the working state, during which exposed copying material passes through the developing chamber, is an important problem in the case of photoprinting machines, which use ammonia gas as the developer medium and operate according to the dry-development principle. This problem is particularly acute because unnecessary evaporation or gasifying of ammonia solution is undesirable and should be avoided to protect the environment. Nevertheless, the high concentration of developer which is necessary for complete development of the copying material should be present in the developing chamber during the developing process.

German Auslegeschrift No. 1,278,239, proposes to solve a somewhat different problem, viz. attaining the state of readiness from the switched-off condition and switching-off again without damaging the copying apparatus and, preferably, without polluting the environment. The German Auslegeschrift discloses an apparatus for the exposure of papers and for their development in a room filled with ammonia vapor, which is controlled by a control arrangement comprising four relays and two thermal circuit breakers. The developing chamber of this apparatus contains a heater and an evaporating radiator and is connected with a pump to feed liquid ammonia. In this apparatus, the problem of controlling the temperature for evaporation of ammonia and for maintaining the temperature in the developing chamber is solved without having to carry out a succession of manual switching operations and without an increased ammonia consumption. The contacts of the four relays and of the two thermal circuit breakers of the control arrangement are connected in various ways which one another and with the motor conveying the paper to be developed, with an exhauster for drawing off the developer gas, with a pump for feeding ammonia solution to the developing chamber containing the heater, with the evaporating radiator, with a copying light source, and a pilot light. It is the purpose of this control arrangement to ensure that the feed pump within the supply tank for liquid ammonia is switched on when a temperature of about 80° C is reached in the developing chamber, and that ammonia is drop-wise introduced into the trough positioned within the developing chamber. At this stage, the pilot light is not yet lighted, which means that the developing chamber is not sufficiently filled with ammonia vapor and that the developing apparatus should not yet be switched on for developing light-sensitive paper. Only when the temperature within the developing chamber has reached about 100° C will the heater be switched off and, simultaneously, the pilot light switched on, indicating that the developing chamber is now sufficiently filled with ammonia vapor and that the temperature is adequate to ensure good development of the paper. Furthermore, the control arrangement ensures that the individual elements of the copying apparatus are switched-off in a certain order to avoid polluting the environment or destroying some parts of the copying apparatus.

With this known apparatus, a state is automatically achieved at which good development of the papers is quaranteed, but the apparatus does not distinguish whether paper is to be really developed at any given moment or not. This means that when the apparatus is ready for work, ammonia is constantly produced and must be constantly disposed of if environmental pollution is to be avoided.

Further, a device for adjusting the evaporating speed of evaporators for ammonia solution has been disclosed in which the evaporating speed is adapted to the speed at which the paper to be developed is conveyed through a photoprinting machine (German Auslegeschrift No. 1,098,362). For this purpose, the device comprises a variable resistor which influences the heat output and is coupled with a means for adjusting the machine speed. The supply of ammonia solution may be controlled by the chicken-water system, or by any other principle by which the liquid level within the evaporator is maintained constant.

An evaporator operating according to this principle has the disadvantage that the evaporating process is rather sluggish in action. It requires a relatively long time until the quantity of vapor produced has been adapted to the operating speed of the photoprinting machine. In order to avoid a lack of developer medium in the developing chamber at any stage of operations, especially when the developing rate is changed, excess developer vapor must be produced. This means an unnecessary consumption of developer medium and unnecessary expense for the disposal of excess developer vapor in order to protect the environment.

Further, a drop-counter for photoprinting machines is disclosed in the prior art (German Auslegeschrift No. 1,098,816) which allows the drop-wise introduction of an electroconductive developer liquid to be evaporated or gasified and which is arranged within the circuit of a signalling, counting, or recording device. By means of this device, the quantity of developer liquid introduced may be influenced and controlled by the speed of passage of the photoprints.

Although it is possible that a photoprinting machine in which this drop-counter is used will operate with less inertia in the generation of gaseous or vaporous developer medium than the above-described known apparatus, it nevertheless must be expected that it will take some time before a stable condition is attained in the developing chamber and the quantity of gas present and recently produced corresponds to the quantity of paper introduced per unit of time.

In the above-mentioned known apparatus (Canadian Pat. No. 573,464), the inertia counteracting a desired change in the quantity of developer gas produced is relatively low, because it is a prerequisite that the temperature within the evaporator always be higher than 100° C, so that a rapid evaporation of developer solution can be expected. Nevertheless, in this case also, considerable waiting times must be tolerated until the desired gas concentration within the developing chamber has been achieved, at least in those cases where no developer gas is supplied as long as no copying material is introduced for development, which is of course desirable in view of environmental protection and of a reasonable consumption of developer medium. As a further drawback, the transportation of the developer gas from the evaporator, where it is generated, to the developing chamber is delayed by the condenser between the evaporator and the developing chamber.

It is the object of the present invention to adapt the generation of ammonia-containing developer gas as quickly and accurately as possible to a change in the operating conditions of a copying apparatus, one of these operating conditions being the state of readiness during which the developing chamber is heated to the correct temperature, but little or no developer gas is continuously produced because no paper is to be developed, and the other operating condition being the working state during which paper fed at normal speed is developed and a relatively large quantity of developer gas must be constantly introduced.

The delay between the moment when the liquid is added and the moment when the substances introduced have become evenly distributed in the developing chamber as a gas is brief, because the developer gas is generated by introducing a liquid ammonia/water mixture and evaporating it at a temperature above 100° C under approximately standard pressure. The period until the working state is reached is substantially reduced, not only because the ammonia/water mixture is constantly added in accordance with the quantity of paper to be developed which passes through the developing chamber, but also because shortly before the paper to be developed enters the developing chamber — after a longer period in which no paper was processed — a relatively large quantity of ammonia/water mixture is initially fed to the evaporator. The developer gas generated is directly conducted into the developing chamber, where it almost completely displaces the inert gas which penetrated or diffused into the developing chamber during the state of readiness of the machine, before the paper even reached the developing chamber. The relatively short delay between the introduction of the liquid developer medium into the evaporator and the moment when the vaporized medium has spread throughout the developing chamber is practically compensated for by the massive dose of developer liquid added at the beginning of the developing process.

After a stable condition is attained in the developing chamber during the developing process, developer liquid is continuously introduced into the evaporator, by pulses, at least as long as paper to be developed is conveyed through the developing chamber. Advantageously, the addition of developer liquid is not interrupted immediately the paper feed stops, but is continued for a short time, in case that the first sheet of paper is quickly followed by a second sheet which is to be developed.

In an apparatus according to the invention, the operating condition prevailing in the developing chamber changes very rapidly and accurately from a state of readiness to a working state. In this manner, a complete development of the paper is achieved, on the one hand, while, on the other hand, the quantity of gas leaving the developing chamber is maintained at a minimum. The entire change-over proceeds automatically and thus is independent of the attention and skill of the operator.

In one embodiment of the copying apparatus, liquid developer medium is fed to the evaporator by a feed pipe, supplying the liquid ammonia/water mixture, directly connected with the developing chamber instead of the evaporator. In an apparatus of this design, the developer gas generated spreads throughout the developing chamber within an especially short time.

Advantageously, the control unit comprises a pulse generator generating a single pulse and a pulse generator generating a pulse train of any desired length, the outputs of the two pulse generators being additively connected with each other and being adapted for connection with the valve. The input of the pulse generator generating a single pulse is connected with a first switch arranged at the entrance of the original to be copied or of a sheet of copying material, and the input of the pulse generator generating a pulse train is connected, in a switch-on branch, with the first switch and with a second switch arranged at the point of delivery of the sheet of copying material or the original, downstream of the developing chamber, a train of pulses being in each case connected with both switches in a switch-off branch through a lag element.

The device according to the invention enables a predetermined quantity of liquid developer medium to be directly fed into the developing chamber or the evaporator, before the original and the sheet of copying material reach the exposure station. After exposure under the original, the copying material passes to the developing chamber where evaporated in the meantime and distributed in the developing chamber as a gas, displacing the inert gas present. As long as an original or a sheet of copying material are detected in the region of the first or of the second switch, the pulse-wise introduction of liquid developer medium into the developing chamber or the evaporator continues. Not before both switches indicate that there is no longer any original or any sheet of copying material in the machine or that the first original to be copied has been delivered, the pulsed introduction of developer medium is shut off. As already mentioned, the interruption is somewhat delayed so that, if another original is introduced quickly, no new transition period with its accompanying larger input of liquid developer medium is released in an unnecessary and undesirable manner.

Preferably, the generator generating the single pulse and the valve in the feed pipe are so dimensioned that for a single pulse of 1 to 10 seconds' duration, about 1/20 cm$^3$ of developer liquid is added per liter of volume of the developer chamber. This quantity is sufficient to reliably fill the entire space of a developing chamber of conventional size with vaporized developer medium, but will not cause considerable quantities of excess developer gas to be forced out from the developing chamber.

The pulses from the pulse train are briefer in any case than a single pulse. Advantageously, the frequency and scanning rate of the pulse train are so adjusted that as much developer gas is practically continuously produced as is taken from the developing chamber by the developing process and inevitable losses.

In order to maintain the state of virtually complete evaporation with the advantageous dynamic properties described above, the copying ammonia/water mixture is introduced into the evaporator only after the previously supplied quantity has completely evaporated.

Figure 2:
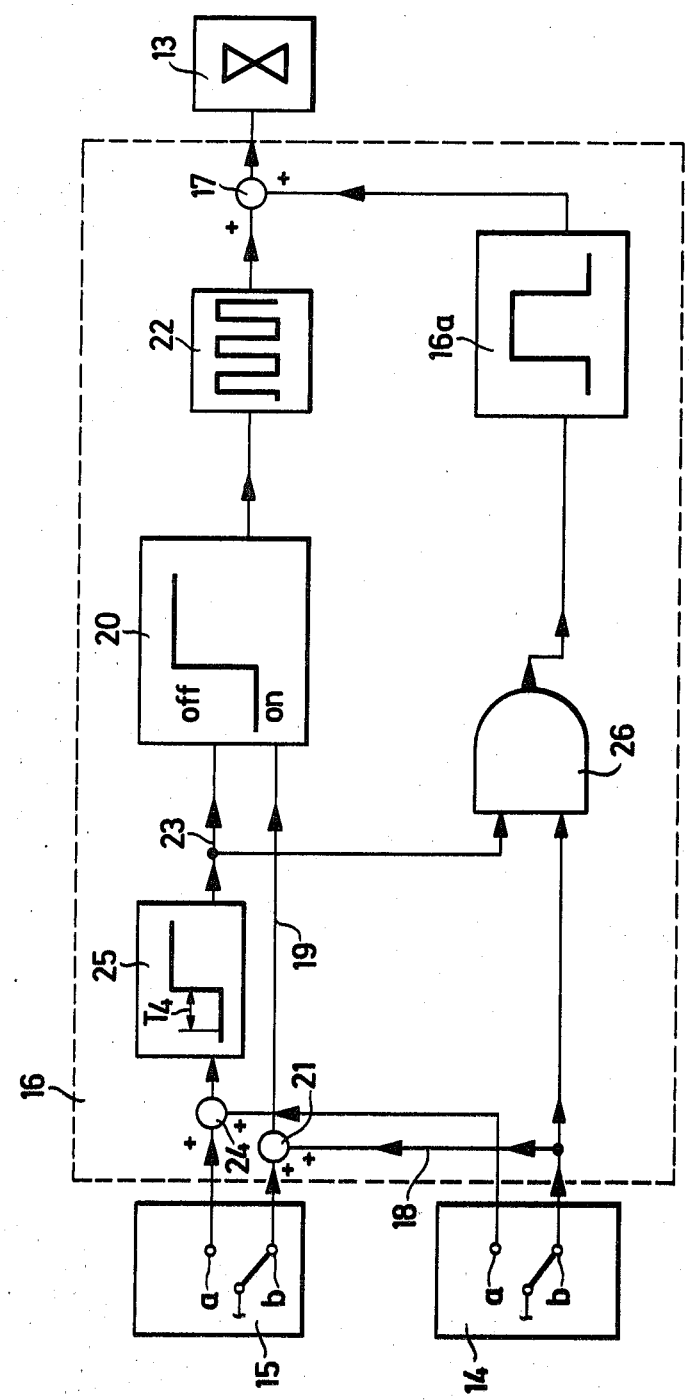
Figure 3:
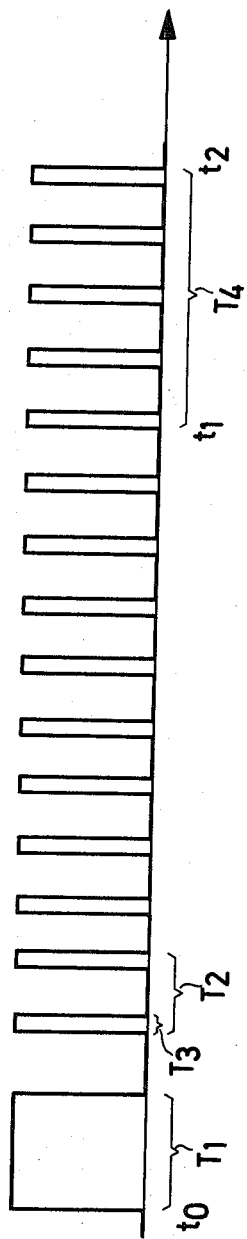

In the following, a particularly advantageous embodiment of the invention will be described by reference to FIGS. 1 to 3 in which:

FIG. 1 shows a photoprinting apparatus in a diagrammatic representation and its control arrangement as far as it is of interest for the invention, FIG. 2 shows a block diagram of a detail of the control arrangement, viz. the control unit, and FIG. 3 shows a time diagram of the operation of the valve.

In FIG. 1, a photoprinting apparatus is generally designated as 1. The path of the originals is indicated by the broken line 2. This path leads from an entrance 3 past a copying cylinder 4 with a light source 5 therein to a delivery point 7. The path of the copying material is indicated by a dash-dotted line 2a. It leads from a magazine roll 3a through a cutting station 3b, past the copying cylinder and through the developing chamber 6 to the delivery point 7a.

The developing chamber 6 is connected by a short pipe 8 with an evaporator 9 which is heated by a filament winding 10. The developing chamber is also equipped with a heater which covers the walls of the developing chamber as uniformly as possible, but is not shown in the drawing. The pipe between the developing chamber and the evaporator is short and its diameter is wide, so that the transport of the gas generated in the evaporator to the developing chamber is restricted as little as possible. The evaporator is connected by means of a feed pipe 12 to a storage tank 11 for aqueous ammonia solution. A solenoid valve 13 is provided in the feed pipe 12. Within the path of the original and near its entrance 3, a change-over switch 14 is positioned. A further change-over switch 15 is provided at the delivery point of the sheets of copying material. The switches 14 and 15 may be operated mechanically or optically, depending upon which design is selected. If an original passes the switch 14, it is in its on-position; at other times, it is in the off position. The same applies to the switch 15. For better illustration, the off-contacts of the switches 14 and 15 are indicated by the numerals 14a and 15a, whereas the on-contacts are indicated by the numerals 14b and 15b. The contacts are connected with a control unit 16. The construction of the control unit 16 is shown in detail within the broken lines of FIG. 2.

As shown in FIG. 2, the on-contact 14b is connected via the input of an AND-member 26 to the input of a generator 16a generating single pulses; the output of the generator 16a is connected over an addition position 17 with the solenoid valve 13. The generator 16a is so designed that it generates a single pulse of a duration $T_1$ when the on-contact 14b is closed and a signal is supplied to a second input of the AND-member. This pulse is shown in FIG. 3.

Further, a line 18 branching from the on-contact 14b leads to a switch-on branch 19 which is connected to the "on" input of a switching element 20. Over an addition position 21, the on-contact 15b of the switch at the delivery point of the original is connected with the switch-on branch 19. The switching element 20 causes a generator 22 generating a pulse train of any desired length to be switched on. The pulse train is composed of pulses having a period $T_2$ and a pulse duration $T_3$; see FIG. 3. The output of the generator 22 is also connected with the solenoid 13 through an addition position 17. A switch-off branch 23 is provided for switching-off the generator 22 the off-positions 14a and 15a are connected with the switch-off branch 23 over a further addition position 24. The switch-off branch 23 comprises a lag element 25 which passes a signal supplied to its input with a time delay $T_4$ to its output; within the switch-off branch 23, the output of the lag element 25 is connected with the "off" input of the switching element 20.

Together with the switching element 20, the switch-off branch 23 causes the termination of the pulse train generated by the generator 22. Further, the switch-off branch 23 is in connection with the second input of the AND-member 26. As will be seen in detail from FIG. 3, the pulse duration $T_3$ is shorter than the duration $T_1$ of a single pulse. The pulse duration $T_3$ is so selected that the concentration of the developer gas does not vary as long as a sheet of copying material passes through the machine. In the following, the generation of the developer gas will be explained by reference to FIG. 3.

When an original passes the entrance 3, the switch 14 is switched over from its off-contact 14a to its on-contact 14b at a time designated as $t_0$. As long as a signal is still supplied to the switch-off branch 23, the generator 16a is excited, through the AND-member 26, to generate a single pulse which reaches the solenoid valve 13 over the addition position 17. Consequently, the solenoid valve 13 opens for a pulse duration $T_1$ and allows a relatively large quantity of an ammonia/water mixture, preferably a quantity ranging from 1 to 15 cm$^3$, to be fed to the heated evaporator 9.

It is of particular advantage if the temperature within the evaporator, the quantity of heat generated per unit time, and the heat conduction are high, so that the liquid mixture introduced evaporates spontaneously and entirely and spreads in the form of a gas through the pipe 8 into the developing chamber 6 when it displaces the inert gas present (air) and fills the developing chamber practically completely. This process proceeds so rapidly that the developing chamber is completely filled with developer gas when the copying material enters the developing chamber, after having passed the copying cylinder together with the original.

At the same time when it causes the generator 16a to generate a single pulse, the on-contact 14b switches on the generator 22 over the switch-on branch 19 and the switching element 20, and the generator 22 generates a pulse train in which the "on" position of the switching element 20 has priority over the "off" position. Like the single pulse, the pulse train is passed to the solenoid valve 13 over the addition position 17. Because the solenoid valve can be only opened or closed, the addition position 17 has the effect that the solenoid valve is opened when it is presented either with a single pulse, or with a pulse of the pulse train, or with a single pulse and a pulse of the pulse train. The means that the pulse train is not noticeable at the solenoid valve before termination of the single pulse, thereafter, the solenoid valve is alternatingly closed and opened for short periods, in accordance with the pulses of the pulse train. By this brief opening, the ammonia/water mixture in the evaporator is filled up, so that during the passage of the copying material the concentration of gas in the developing chamber 6 is maintained practically constant. As soon as the trailing edge of the original has passed the entrance 3, the switch 14 is returned to its off-position on the off-contact 14a, but this has no effect as long as the switch 15 near the delivery point of the copying material is still switched on. Only after the switch 15 has been switched over to its off-contact 15a, at the time $t_1$, the switch-off branch 23 with the lag element 25 and the switching element 20 become effective in that, after expiration of the time delay $T_4$, the generator 22 generating the pulse train is switched-off. This is reached at the time $t_2$. As a result of the delay caused by the lag element 25, optimum conditions for development prevail in the developing chamber even when a sheet of copying material has just left the developing chamber and the next sheet to be developed follows.

In summation: Even before a sheet of copying material enters the developing chamber for development, optimum operating conditions are created within the developing chamber without evaporating unnecessary quantities of an ammonia/water mixture. The process operates automatically and without delay and is controlled by the introduction of an original and the delivery of copying material.

It will be obvious to those skilled in the art that many modifications may be made within the scope of the present invention without departing from the spirit thereof, and the invention includes all such modifications.

What is claimed is:

1. In a copying apparatus, particularly a photoprinting apparatus, comprising an exposure station, a developing chamber, and an evaporator associated with the developing chamber, in which a developer composed of an ammonia/water mixture is virtually completely evaporated and over-heated at a temperature above 100° C, preferably about 105° C, and at a predetermined pressure, preferably atmospheric pressure, the apparatus further including, for dosage of the ammonia/water mixture, a feed pipe connected with the evaporator, a valve connected with the feed pipe, and a control unit connected with the valve, whereby the rate of feed of the ammonia/water mixture may be adapted to different operating conditions, the improvement comprising first switch means, actuatable by an original, positioned at an entrance for the original upstream of an exposure station in the feed direction of the apparatus, second switch means, actuatable by a copying material, positioned at a delivery point of said copying material downstream of said developing chamber, control unit means electrically connected with said first and second switch means, said control unit being so constructed that after said first switch means has been switched to a first position by the original, the valve is first opened for a relatively long period of time, and the valve is then alternately opened and closed, in accordance with pulses, as long as the first or second switch means is maintained in its first switching position by one or more originals or one or more sheets of copying material, respectively, and said pulse-wise opening and closing of the valve is terminated only when neither the first nor the second switch means is maintained in its first switching position by an original or a sheet of copying material, respectively.

2. A copying apparatus according to claim 1 including means directly connecting the evaporator with the developing chamber.

3. A copying apparatus according to claim 1 including means directly connecting the feed pipe supplying the ammonia/water mixture with the developing chamber, and the temperature prevailing within the developing chamber is always above 100° C, preferably between 105° and 120° C.

4. A copying apparatus according to claim 1 in which the control unit comprises a first generator which generates a single pulse and a second generator which generates a pulse train of any desired length;

means additively connecting the outputs of these generators with each other and for connection with the valve;

means connecting the input of the first generator generating the single pulse with the first switch;

and means connecting the input of the second generator generating the pulse train, by way of a switch-on branch, with both switches, and, by way of a switch-off branch and a lag element, also with both switches.

5. A copying apparatus according to claim 4 in which the first generator generating the single pulse and the valve are so dimensioned that during a single pulse of 1 to 10 seconds' duration, 1/20 cm³ of developer liquid is supplied per liter of volume of the developing chamber.

6. A copying apparatus according to claim 4 in which the first generator generating the single pulse and the second generator generating the train of pulses are so dimensioned that the single pulse is longer than a pulse of the train of pulses.

* * * * *